United States Patent [19]

Sollbach et al.

[11] Patent Number: 4,775,026
[45] Date of Patent: Oct. 4, 1988

[54] ACTUATION OF A DIFFERENTIAL LOCK

[75] Inventors: Gerhard Sollbach, Friedrichshafen; Walter Keller, Salem; Friedrich Ehrlinger, Friedrichshafen; Peter Dziuba, Überlingen, all of Fed. Rep. of Germany

[73] Assignee: Zahnradfabrik Friedrichshafen AG, Friedrichshafen, Fed. Rep. of Germany

[21] Appl. No.: 916,547

[22] PCT Filed: Aug. 16, 1985

[86] PCT No.: PCT/EP85/00418
§ 371 Date: Apr. 24, 1986
§ 102(e) Date: Apr. 24, 1986

[87] PCT Pub. No.: WO86/01467
PCT Pub. Date: Mar. 13, 1986

[30] Foreign Application Priority Data

Aug. 29, 1984 [WO] PCT Int'l Appl. .............. PCT/EP84/00259

[51] Int. Cl.[4] .............................. B60K 17/35
[52] U.S. Cl. ............................. 180/249; 74/710.5; 180/252
[58] Field of Search .............. 180/247, 248, 249, 250, 180/252; 74/710.5, 711

[56] References Cited

U.S. PATENT DOCUMENTS

| 2,803,150 | 8/1957 | Fisher ............................. 74/710.5 |
| 2,874,790 | 2/1959 | Hennessey .................. 74/710.5 X |
| 4,162,712 | 7/1979 | Nelson ............................. 74/711 X |
| 4,523,494 | 6/1985 | Sparks et al. ................. 74/710.5 |
| 4,559,847 | 12/1985 | Newendorp et al. ........ 74/710.5 |
| 4,570,509 | 2/1986 | Nighswonger ............... 74/710.5 |

FOREIGN PATENT DOCUMENTS

| 0128478 | 12/1984 | European Pat. Off. . |
| 96041 | 5/1972 | France . |
| 2434969 | 3/1980 | France . |
| 459638 | 4/1928 | Fed. Rep. of Germany . |
| 24540A | 6/1984 | Italy . |
| 58-49556 | 3/1983 | Japan . |
| 59-96019 | 6/1984 | Japan ............................. 74/711 |

OTHER PUBLICATIONS

International Application (PCT), WO 81/02049, Published Jul. 23, 1981, (Avery).
Sige Catalog, Brevetti Ing. Colombo SPA "Elektronisches Selbstsperrdifferential".

Primary Examiner—John J. Love
Assistant Examiner—Charles R. Watts
Attorney, Agent, or Firm—Herbert Dubno

[57] ABSTRACT

This actuation of a differential lock consists essentially of the locking differential (10) and the coupling (11) connected thereto, which via an electromagnetic actuating means (12) connects that part of the locking differential (10) driven by the universal shaft when and as long as a predeterminable value of the steering angle is attained or exceeded. The sole signal generator used for this purpose may be, as required, realized as a contact built immediately into the switching circuit of the electromagnetic actuating means (2), or an inductive switch or potentiometer, respectively, in the area of the angle-dependent steering elements, and held fast in the axle housing (2), protected from damage. The switching means (7) is capable of being actuated either via further switches (17) and (30) manually by the driver, or may be combined with the engagement lever for the supplementary drive on steering axle (1) so that the locking differential (10) can only be actuated under appropriate driving conditions. The frequency of actuation of the locking differential (10) is thus limited to the essential cases of necessity, and a simpler and more robust engagement technique is achieved.

7 Claims, 3 Drawing Sheets

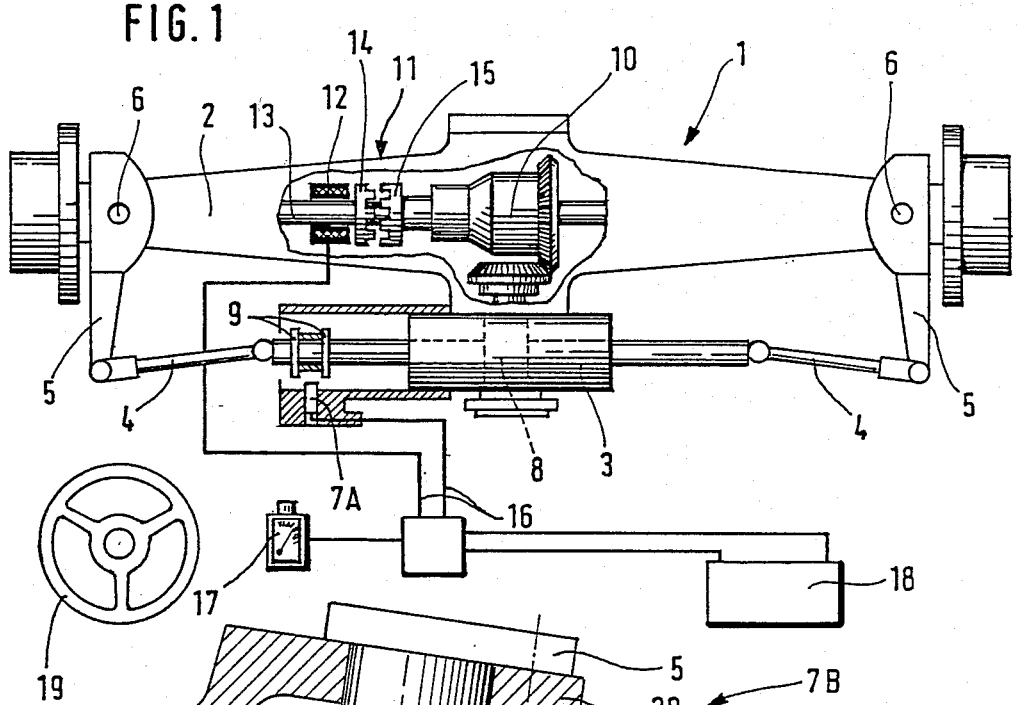
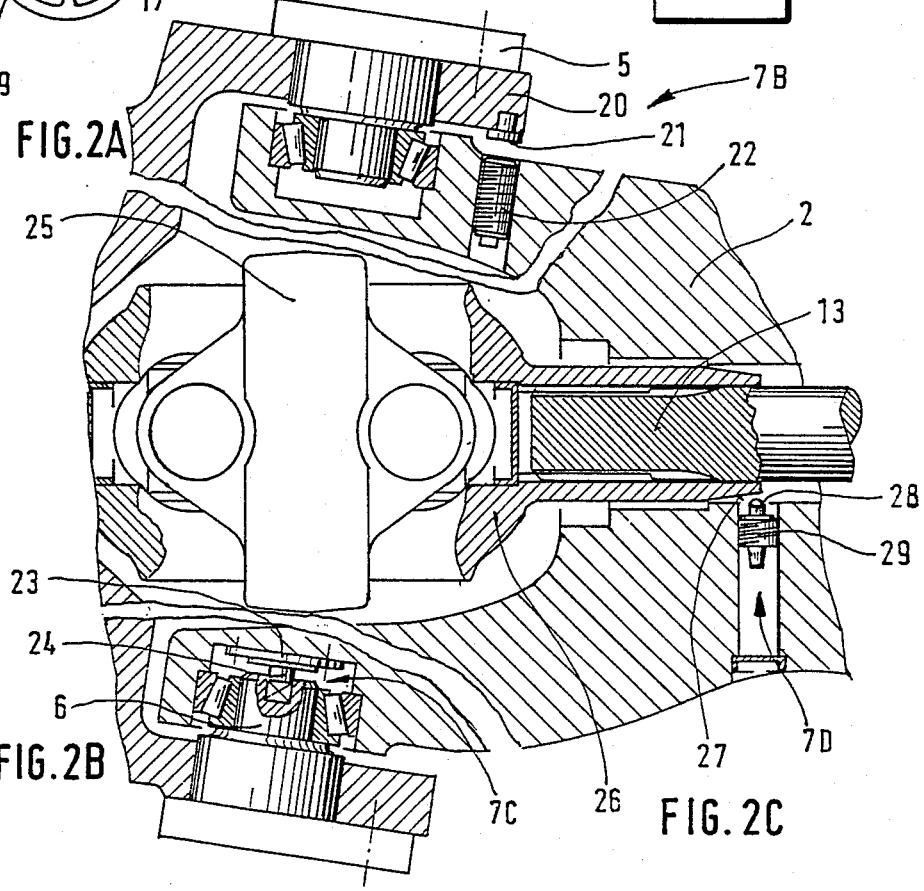

ACTUATION OF A DIFFERENTIAL LOCK

FIELD OF THE INVENTION

This invention concerns the actuation of a differential lock controlled by signals originating outside the lock.

BACKGROUND OF THE INVENTION

It is known how to actuate locking differentials by monitoring differences of speed rotation (similar to anti-blocking systems). Thus, a catalog of the SIGE Company, Vimercate (Italy) shows an "electronic locking differential" whose operating principle utilizes two speed-of-rotation sensors on the two wheels of shaft stubs, respectively, whose signals are compared electronically and then converted to an engagement signal for an electronically operable locking clutch. This type of construction is particularly unsatisfactory for vehicles with additionally clutchable drive axles for the following diverse reasons:

(a) The first reason is that the shifting principle exemplified by the SIGE catalog causes actuation of the lock immediately when a predetermined difference of rotational speed is reached, regardless of the cause. The synchronous rotation of the wheels thus attained leads again to a release of the lock. Therefore, a reactivation can occur immediately and it can, at an appropriate configuration of the terrain, come to a continuous actuation and deactuation which severely stresses the locking means. One attempts to counter this problem by means of an actuation delay. However, the problem will still divert a driver's attention.

(b) One needs, in addition, to two sensing positions, a relatively sensitive and complex electronic conversion means because an engagement point for an electrical coupling operated with switching current cannot be preset with mechanical exactitude.

(c) Furthermore, the prevention of accidental activation and deactivation of the lock during driving conditions when it is not desired (e.g. release of lock during turning of a tractor on strongly inclined, irregular terrain) based on comparison of speed of rotation is not attainable with absolute certainty. The reason for such uncertainty may be traced to the many influences of load distribution or terrain properties which are never exactly determinable in advance upon the release of the engagement actuation.

(d) Finally, the installation of two electronic measuring sensors to be attuned to each other on the two drive shafts increases or multiplies the problems of assembly, protection from damage, and inspection.

It is an objective of the present invention to advance the state of the art in such manner than an engagement means is created less complex and less prone to malfunction in an actuation range exactly predeterminable, easily installed, where the driver can clearly foresee the occurrence of the engagement point, and steer accordingly.

SUMMARY OF THE INVENTION

According to this invention an actuator device is provided for a differential lock which is controlled by a signal originating outside the differential lock, with a signal generator (7) actuated upon at an immediately sensed value of a steering angle excursion (L) due to an excursion of a displaceable steering element (5, 20) with respect to an axle housing (2) wherein the improvement comprises the signal generator (7) being mounted embedded in a construction element (2, 3) rigidly connected to the axle housing (2) so as to provide protection against impact, dirt and damage, and wherein a locking differential (10) comprises an electrically actuatable coupling (11) in an electrical switching circuit of the signal generator (7) whereby connection cables (31) are brought to said signal generator through the axle housing (2).

The accomplishment of the invention objective is based on the fact that for the actuation of the differential lock there is no need for two sensors and an electronic evaluation device for differences either in speed of rotation or of torque to actuate the differential lock. Instead, there is now a single YES-NO electrical engagement signal immediately scannable, if possible, by galvanic means. The foregoing arises directly from a mechanical change of the steering geometry, wherein the signal can be transferred without or with minimal application of electronics directly to the engagement coupling. As a result, this reliably causes the disengagement or reengagement of the lock always exactly in the same driving condition which is exactly foreseeable by the driver by feel after a short familiarization. With mechanical steering drives it is even possible to associate the engagement points exactly with certain positions of the steering wheel.

In addition to economic and operational advantages due to a simpler engagement method no longer dependent upon properties of the terrain or grade, but with an exact engagement function, exclusively dependent on the steering angle and clearly foreseeable, there is the further advantage of no unnecessary IN-OUT engagement stresses of the locking coupling due to short differences in speed of rotation e.g. caused by the terrain.

Thereby the automatic engagement of the locking function with maximum reliability remains operative. Concomitantly the driver when steering into a curve with appropriate steering excursion also operates the locking engagement involuntarily or forcedly and without special manipulation. After a short familiarization period he will thus not consider the temporary disengagement of the locking device in sharp curves or while turning as something special since when driving straight ahead or in wide curves the unwanted change in lock engagement cannot take place.

Naturally, the advantages of the invention take effect regardless of the type or locking coupling construction or of the switch or the kind of signal given by it. The application in combination with a positively engaged coupling in the same engagement circuit as the signal source is possible in a simple manner. In normal use there becomes possible both a drive entirely slip free in the two wheels as well as reliable signal transmission entirely dependent on the steering angle.

From the field of anti-blocking systems, brake actuations have become known that are also controlled from the steering angle. However, in such cases the transmission of the full driving force are hindered, whereas in all-wheel drives with locking differentials it is facilitated.

There are a number of specific embodiments of the present invention. These embodiments relate to various types of switches which may be located in a more advantageous position so as to provide greater protection against damage. Choice of any particular switch depends upon the axle construction. Thus, for instance, an angle potentiometer may be utilized as a signal generator mounted in an area of a rotatable steering pivot bearing (5, 6) (fork or housing of the shaft universal joint, respectively).

A limit switch may be used as the signal generator (7B) mounted in an area of a linearly movable steering actuation (3, 4) (piston of the steering cylinder).

Placement of a potentiometer or limit switch is possible in the interior of a hollow axle in a manner such that the signal generator (7C) is mounted in an area of a linearly translatable element of the shaft universal (fork bushing 26).

A non-contacting, e.g. inductive, actuator can be provided where the skewed position of the steering housing with respect to the axle housing is used to generate a signal proportional to the steering angle. In other words, the signal generator (7D) may be mounted in an area of a pivotably moving element of the shaft universal joint (25).

An elastically actuated positive-engagement coupling is a preferred embodiment whose switching current is capable of being switched on or off directly via the signal generator. Specifically, an electrically operable positive engagement coupling (14, 15) may be provided as a locking differential (10) in an electric switching circuit (16) of the signal generator (7).

It goes without saying that means of actuation other than electric ones can also be used, e.g. hydraulic, pneumatic or electric-motor actuators. In place of the positively engaged coupling, a friction or viscous clutch etc. can be operated in the same manner.

There is also provided the capability for adapting the response sensitivity of the signal generator or the position of the limit value. This permits resetting from that level preset by the manufacturer. Resetting may be desirable for exceptionally slippery terrain where one wants to work without interruption of the locking action so as to improve wheel adhesion. For this purpose one can utilize an analog as well as a digital signal which scans the steering angle. An optical indication of the position of the given limit value in the range of the steering angle is also realizable in a simple and accurate manner if desired.

Furthermore, there is provided a combination of the differential lock actuation with an engagement selector for the respective driving axle. Herein the lock can only be engaged with a driving axle actually in operation, so that the wear and tear effects attendant upon the operation of a differential lock can be limited to those phases of operation where the driver expects an advantage in conjunction with an all-wheel drive.

Another feature of this invention provides a signal generator arrangement in which not only a continuous, exact and troublefree measurement of the steering angle is excecuted during operation, but where a simple readjustment is also made possible. In this case, the potentiometer and its connection is integrated into a bearing which moves in synchronism with the steering angle directly, safe from impact and contamination, and in a manner that unauthorized readjustment is safely prevented.

BRIEF DESCRIPTION OF THE DRAWING

The above and other objects, features and advantages of the present invention will become more readily apparent from the following description, reference being made to the accompanying drawing in which:

FIG. 1 shows the top view of a powered steering axis in which on the steering cylinder a switch contact is provided for the actuation of the locking differential;

FIG. 2A shows a detail of the axle housing in an embodiment where the switch for sensing of the steering angle is mounted in a linearly movable piston of the steering cylinder;

FIG. 2B shows a detail of the axle housing in an embodiment where the switch for sensing the steering angle is mounted in a linearly translatable element of the shaft universal joint;

FIG. 2C shows a detail of the axle housing in an embodiment where the switch sensing the steering angle is mounted in a pivotally moving element of the shaft universal joint

In FIG. 1 the steering axle 1 is equipped with a steering cylinder 3 built directly onto its housing 2. Steering levers 5 are connected on one end to steering cylinder 3 and on their other end are pivoted about steering pivot 6 in one direction or the other via tie rods 4. A switch 7 sunk into steering cylinder 3 is activated by one of two switch cams (or magnets) arranged to either side on steering piston 8. The engagement impulse arises here solely from a partway executed steering angle L, deviating from straight-ahead, provided that the locking differential 10 built into axle housing 2 does not happen to be engaged via its associated coupling 11. Thus, the engagement impulse occurs independently of rotation speed or of differences in rotation speed, which differences in fact arise as a consequence of steering angle displacement. Coupling 11, preferably constructed as a positive-engagement coupling, has an electromagnetic actuation 12 on an axially translatable shaft 13 limited for powered translation at a steering angle excursion. Coupling 11 can positively engage one of the coupling halves 14 with the other coupling half 15 to transmit rotation and thus effect rotational synchronism of the two wheels for the duration of current flow. Under this invention the positive engagement and transfer or rotation remains effective until the switching current in connecting wiring 16 is interrupted again. Interruption can be effected by the driver by means of a manual switch 17 and/or by the built-in steering angle switch 7. In addition, the means, not shown, of engaging the front axle via an additionally provided coupling on the universal shaft can exhibit a further contact (e.g. switch 30) by which the current supply for actuation of electromagnet 12 is interruptible. Thus, an engagement of the electromagnetic actuation 12 can only occur upon actually energizing the axle provided with the locking differential. The switches 7/17 etc. and the actuation of electromagnet 12 are connected to the vehicle power supply 18 via connecting wiring 16. By means of a position indication on manual switch 17, and its positioning in the area of steering wheel 19, there is afforded the capability for the driver to recognize the engagement and disengagement of locking differential 10.

FIG. 2A-C show several possibilities of positioning of the switches 7B, 7C, 7D in accordance with the invention.

Figure 3:
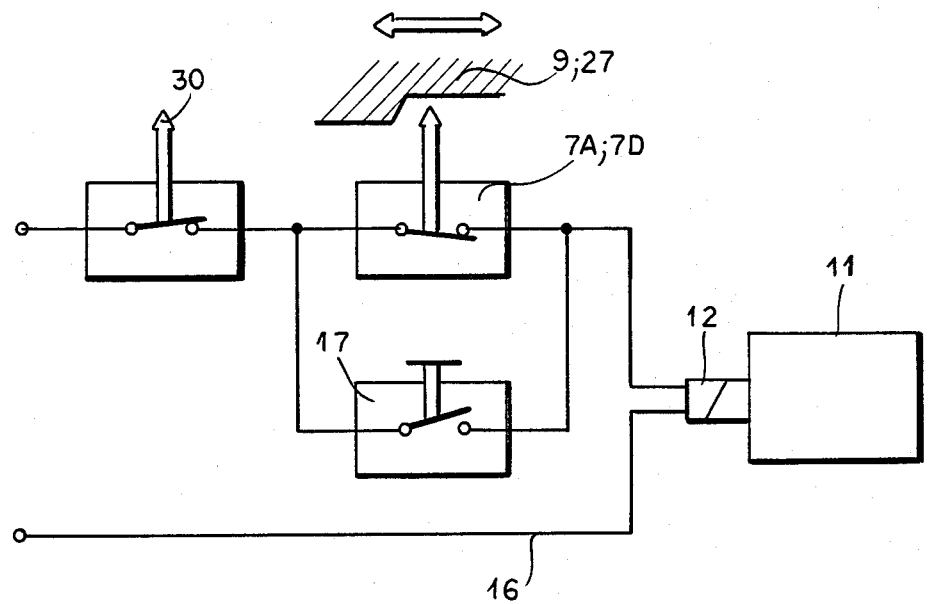
FIG. 3 shows a switching schematic detailing the arrangements of differential switch placements.

Switch 7B could for instance be an inductive signal generator which consists of a magnetic disk 21 sunk into the edge of wheel hub fork 20. When steering lever 5 pivots thereby approaching one of two coil bodies 22 fixed thereunder in the axle housing the signal generator is actuated and either passes current or interrupts it to the electromagnetic actuation 12, not shown. For simplicity, the cable connections to the switches are not shown in the drawing.

Another similar possible arrangement to achieve the same function involves use of a shaft universal 25 carrying a ring of ferromagnetic material interacting with a coil body sunk into housing 2 to interrupt or connect an actuating current.

The switch 7C alternative embodiment is shown as a potentiometer 23, whose body is fixed in the bearing bore for the steering pivot 6 on housing 2. This switch engages steering pivot 2 through a small shaft 24 so that upon its rotation, depending on the angle, a larger or smaller current can flow through, by which means the switching point for electromagnetic actuation can be fixed.

The switch 7D alternative embodiment utilizes the linear translation of universal joint 25 between spline shaft 13 and the fork housing 26 and is dependent on the steering angle. Switch 7D consists essentially of an actuating edge 27 on the end of fork housing 26 facing the differential. Edge 27 in the presence of an appropriately large steering angle excursion contacts an actuating pin 28 of a pressure switch 29 sunk into a bore extending to the inner wall of axle housing 2.

In FIG. 3 is shown the electromagnetic actuation 12 of coupling 11 which is part of the locking differential 10. Connecting wiring 16 is energized from a signal generator selected from switches 7A to 7D via the respective switch cam 9, actuating edge 27, magnet coils 22, or potentiometer 23. Energization will depend either on the steering angle, on a manual or foot switch 17 at the discretion of the driver, or on the position of an all-wheel engagement lever 30 (in conjunction with an actuating mechanism not shown). The various actuating versions can be equipped with the usual electromechanical elements as required with amplifying or retarding members in order to accomplish accommodations to tire size or terrain without complicated exchanges of sensors or program modifications.

The interdependence between the steering angle switch 7 and the manual switches 17 and all-wheel engagement lever 30, respectively, ensures that the locking differential can only be actuated automatically at the appropriate driving conditions, via steering angle excursion. Thereby, the frequency of engagement of the locking differential is reduced to the essential minimum necessary and a simpler more robust engagement technique is attained.

Figure 4:
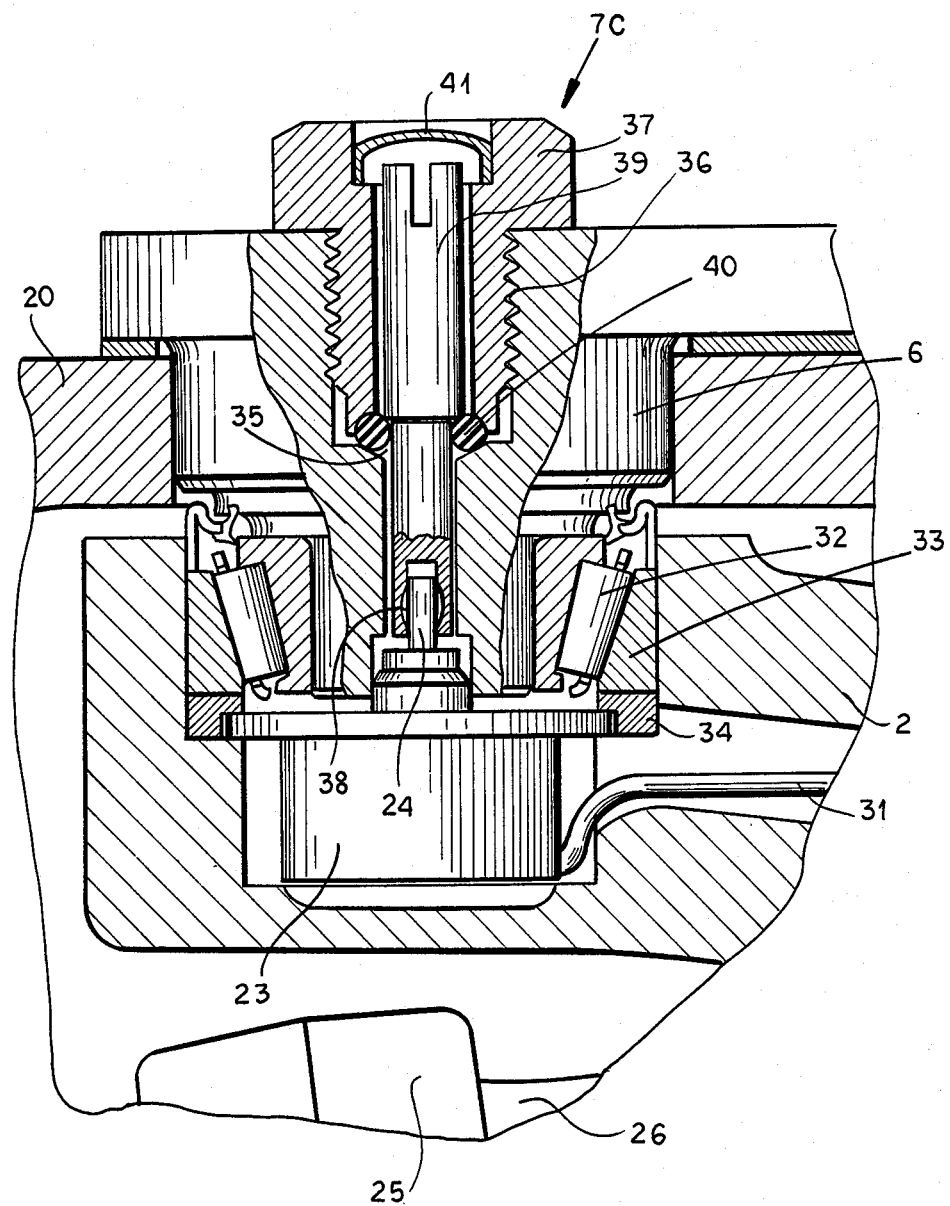
FIG. 4 shows a preferred signal generator arrangement within a steering pivot.

In FIG. 4, the signal generator 7C is a rotary potentiometer 23 whose connecting cable 31 to the vehicle power supply 18 and the all-wheel engagement lever 17 and 30, respectively is run, protected from damage, through axle housing 2. Thereby, the rotary potentiometer 23 is integrated into pivot bearing 32 inasmuch as its housing is fastened to a retainer flange 34 fixed against rotation below outer bearing race 33 in axle housing 2. A stepped bore is provided in steering pivot 6 whose largest diameter receives hollow screw 37 via internal thread 36. into hollow screw 37 is rotatably inserted adjusting pin 39 held in positive engagement with the potentiometer shaft 24 by means of a screw driver slot and expansion spring 38. The adjusting pin 39 can be further clamped in place inside hollow screw 37 by means of a sealing ring 40 positioned adjacent shaft 24 and facing the axle. After adjustment through the screw driver slot on its upper face to eliminate radial play, adjusting pin 39 is fully secured within the hollow screw 37 by capping with a closure cap 41. The adjusting pin 39 is held fast elastically by internal chamfer of the hollow screw 37 and by the squeezing force of the sealing ring 40 in such manner that the potentiometer shaft 24 is reliably taken along rotationally in the prevailing direction of rotation. Surprisingly, small angular errors or normally occurring axial displacements of the foregoing arrangement cause no damage to the potentiometer 23.

We claim:

1. An actuator device for a differential lock which is controlled by a signal originating outside the differential lock, said device having a signal generator (7) actuated upon at an immediately sensed value of a steering angle excursion (L) due to an excursion of a displaceable steering element (5, 20) with respect to an axle housing (2) wherein the improvement comprises the signal generator (7) being mounted embedded in a construction element (2, 3) rigidly connected to the axle housing (2) so as to provide protection against impact, dirt and damage, said signal generator being mounted adjacent a longitudinally displaceable piece of shaft joint part (25) in a fork bushing (26) on a side of a locking differential (10), said locking differential (10) being an electrically actuatable coupling (11) in an electrical switching circuit of the signal generator (7) whereby connection cables (31) are brought to said signal generator through the axle housing (2), said signal generator being a rotating potentiometer (23) arranged below a steering pivot (6) with a potentiometer shaft (24) facing said steering pivot (6) which is non-rotatably connected to the axle housing (2) by means of a holding flange (34), below the outer bearing race (33) at a pivot bearing (32), and that in the steering pivot (6) there is provided a step bore (35) equipped with a thread (36) at its greatest diameter and rigidly connected with the wheel hub fork (20) but swingably movable with respect to the axle housing (2), wherein a hollow screw (37) grasps an adjusting pin (39) slotted on both ends and positively coupled to the potentiometer shaft (24) by means of an expansion spring (38) and holds a radial play of said adjusting pin locked by means of a sealing ring (40) positioned before it with respect to the axle.

2. An actuator device according to claim 1, characterized by the signal generator being mounted adjacent of a linearly movable steering actuator (3,4) which comprises a piston (8) of a steering cylinder (3) inserted directly from the axle housing (2).

3. An actuator device according to claim 1, characterized by the signal generator being mounted adjacent a rotatably movable steering pivot bearing (5, 6) and in a fork (20) of the axle housing (2) of a shaft joint (25).

4. An actuator device according to claim 1, characterized by the signal generator being mounted adjacent a swingably movable shaft joint part (25) in a fork bushing (26).

5. An actuator device according to claim 1, characterized by the signal generator being mounted adjacent a longitudinally displaceable piece of shaft joint part (25) in a fork bushing (26) on a side of the locking differential.

6. Actuation according to claim 5, characterized by that the signal generator (7C) is a rotating potentiometer (23) arranged below a steering pivot (6) with potentiometer shaft (24) facing steering pivot (6) which is non-rotatably connected to the axle housing (2) by means of a holding flange (34), below the outer bearing race (33) at the pivot bearing (32), and that in the steering pivot (6) rigidly connected with the wheel hub fork (20) but swingably movable with respect to the axle housing (2) a step bore (35) equipped with a thread (36) at its greatest diameter is provided, wherein a hollow screw (37) grasps an adjusting pin (38) (sic) slotted on both ends and positively coupled to the potentiometer (24) by means of a an expansion spring (38) and holds its radial play locked by means of a sealing ring (40) positioned before it with respect to the axle.

7. An actuator device according to claim 1, characterized by the coupling (11) being constructed as a positive locking coupling with an electromagnet

* * * * *